United States Patent

[11] 3,599,084

| [72] | Inventor | Barkev Y. Bakamjian<br>New Canaan, Conn. |
|---|---|---|
| [21] | Appl. No. | 832,612 |
| [22] | Filed | June 12, 1969 |
| [45] | Patented | Aug. 10, 1971 |
| [73] | Assignee | Schlumberger Technology Corporation<br>Houston, Tex. |

[54] METHOD AND APPARATUS FOR INVESTIGATING THE PERMEABILITY OF EARTH FORMATIONS IN A BOREHOLE BY DETERMINING POLARIZATION LEVELS BEFORE AND AFTER SONICALLY INDUCED FORMATION FLUID FLOW
9 Claims, 2 Drawing Figs.

| [52] | U.S. Cl. | 324/1, 324/10 |
|---|---|---|
| [51] | Int. Cl. | G01v 3/02, G01v 3/18 |
| [50] | Field of Search | 324/1, 10 |

[56] References Cited
UNITED STATES PATENTS

| 2,165,013 | 7/1939 | Schlumberger | 324/1 |
|---|---|---|---|
| 2,199,705 | 5/1940 | Karcher | 324/1 |
| 2,269,890 | 1/1942 | Blau | 324/1 UX |
| 2,873,423 | 2/1959 | Graham et al. | 324/10 X |
| 2,974,273 | 3/1961 | Vogel et al. | 324/1 |

*Primary Examiner*—Gerard R. Strecker
*Attorney*—Brumbaugh, Graves, Donohue & Raymond

ABSTRACT: A polarizing DC current is passed through an earth formation traversed by a bore hole and the polarization level of the formation is determined by measuring the resistivity of the formation electrolyte. The formation is then excited by a sonic transducer to cause fluid flow through the formation. During excitation of the formation, the polarization level is again determined and the reduction in the polarization level from the original level is observed to obtain indications of the extent of fluid flow present and hence of the relative or actual permeabilities of the formation.

PATENTED AUG 10 1971 3,599,084

INVENTOR.
B.Y. BAKAMJIAN
BY Brumbaugh, Graves,
Donohue & Raymond
his ATTORNEYS.

3,599,084

METHOD AND APPARATUS FOR INVESTIGATING THE PERMEABILITY OF EARTH FORMATIONS IN A BOREHOLE BY DETERMINING POLARIZATION LEVELS BEFORE AND AFTER SONICALLY INDUCED FORMATION FLUID FLOW

BACKGROUND OF THE INVENTION

The present invention relates to method and apparatus for investigating the permeability of earth formations traversed by a borehole and, more particularly, to novel and improved methods and apparatus for determining the relative or actual permeabilities of such formations by applying sonic energy to the formations and observing the reductions in the polarization levels of the formations caused by the induced fluid flow.

In this regard, it is desirable to obtain permeability information through the combined use of induced fluid flow and electric current flow to produce variations in the polarization levels of the formations, which variations are indicative of the permeabilities of the formations. Significant advantages are realized by this method in that it is readily adapted to allow continuous permeability determinations to be made and, very importantly, in that polarization level measurements can be made free of the difficulties arising from contact potentials that often interfere with the measurement of electrokinetic potentials.

SUMMARY OF THE INVENTION

There are provided, in accordance with the invention, methods and apparatus for determining the actual or relative permeabilities of subsurface earth formations by passing a polarizing DC current through a formation; exciting the formation to induce fluid flow through the pores of the formation concurrently with the passage of the polarizing current; and determining the extent to which the polarization level of the formation is reduced by the induced fluid flow. As the extent of the reduction in the polarization level is directly proportional to the extent of the fluid flow, and since the permeability of the formation governs the amount of fluid flow occuring, the reduction in the polarization level is a direct indication of the permeability of the formation. Thus, the measured reductions are comparable with similar data from earth formations of known permeability to obtain knowledge of the relative permeability of the formations investigated.

Moreover, it is possible to make quantitative determinations of formation permeability by applying a conversion factor representing the relationship between the reduction data and actual permeability values in previously investigated formations to the measured reduction in the polarization level of the formation under study.

More specifically, permeability determinations are made in accordance with the present invention by positioning a well tool, carrying one or more sonic transducers, a DC electrode system and an AC electrode system, in contact with the surface of a formation to be investigated. A DC current is then passed through the formation by the DC electrode system to polarize the formation, or, more accurately, the formation electrolyte. The AC electrode system is then actuated to pass an AC current through the formation, and measurements are made at one or more selected AC electrodes of the extent of polarization by measuring the resistivity of the formation electrolyte. Subsequently, fluid flow is induced in the formation by applying sonic energy to the formation with the transducer. Measurements are then again made of the polarization level of the formation, and the reduction in the polarization level from that existing without fluid flow to that existing with fluid flow is determined. As noted, knowledge of the relative or actual permeabilities of the formation is obtainable by relating the observed drop in polarization to corresponding data from other formations. Preferably, measurements are made at a plurality of excitation frequencies at each location in the borehole.

Suitable apparatus is used to indicate and record the measured quantities in a form facilitating either manual or automatic processing of the data to derive the relative or actual permeabilities of the formation investigated.

BRIEF DESCRIPTION OF THE DRAWINGS

For a better understanding of the invention, reference may be made to the following detailed description of a representative embodiment, taken in conjunction with the figures of the accompanying drawings in which.

DESCRIPTION OF A REPRESENTATIVE EMBODIMENT

Figure 1:
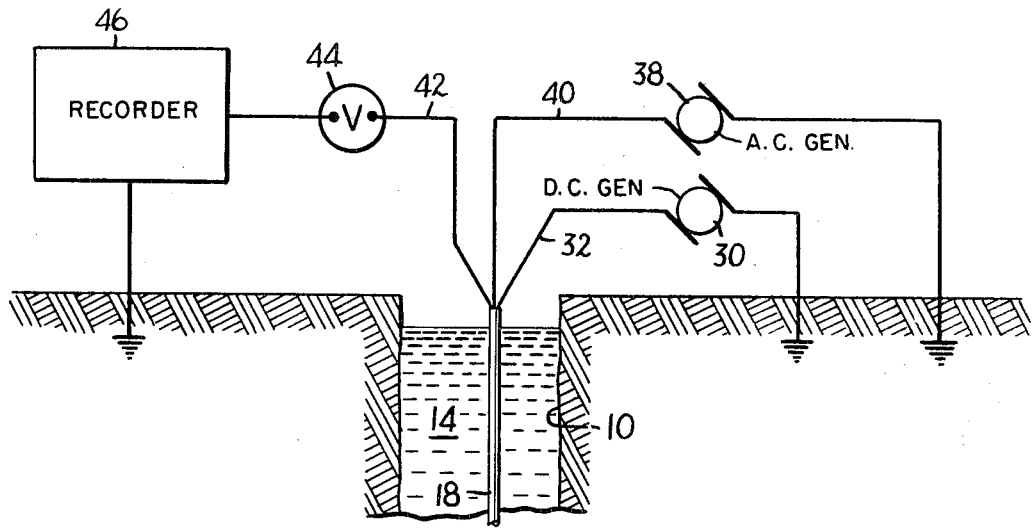
FIG. 1 is a schematic diagram of suitable apparatus for investigating in accordance with the present invention the permeability of earth formations traversed by a borehole.

The passage of a DC current through a rock sample containing saline water is known to cause a "polarization" of the rock, the extent of which is observable as an increase in the electrical resistivity of the rock electrolyte. Theoretically, polarization is a manifestation of the uneven distribution of the salt molecules within the pores of the rock brought about by the selective passage of the salt ions through constrictions leading in and out of individual pores in the rock. In other words, the salt molecules in the pores redistribute themselves under the influence of a DC current so as to cause an increase in concentration in one-half of each pore and a depletion in concentration in the other half. The resulting heterogeneous distribution of the salt molecules has an electrical resistance greater than the initial homogeneous distribution which prevailed before the passage of the polarizing current.

Experiments have demonstrated that the extent of polarization, i.e., the polarization level, of a rock sample is reduced significantly by the movement of the fluid contained in the pores of the rock and that the magnitude of the reduction is independent of the direction of flow of the fluid. These experiments also have demonstrated that the reduction in the polarization level of the rock sample is a function of the extent of fluid flow, and thus of the permeability of the rock, and, in fact, is directly proportional to permeability. In other words, the greater the reduction in the polarization level, the greater the extent of fluid flow present and the higher the permeability of the rock; conversely, a small reduction in the polarization level is indicative of a limited degree of fluid flow and of low permeability.

The drop in the extent of polarization of the rock due to the presence of fluid flow is believed to result from a partial redistribution of the salt molecules from the segregated concentrations produced by the polarizing DC current. A more homogeneous mixture of the salt ions is thus produced, with a corresponding drop in the electrical resistance of the rock electrolyte from the magnitude of the resistance when the sample is fully polarized.

It has now been discovered that the foregoing findings and theory can be applied to investigate the permeability of subsurface earth formations in situ through the use of suitable borehole apparatus that can be remotely positioned adjacent the formations of interest. Such apparatus is illustrated schematically in FIG. 1 as being disposed in a borehole 10 which traverses a subsurface earth formation 12 and contains a borehole fluid 14. A representative form of the borehole apparatus includes a well tool 16 supported by a cable 18, and is adapted to be raised and lowered in the borehole by conventional winch means (not shown) located at the ground surface.

The well tool 16 includes an elongated housing 20 having a logging device 22, such as a selectively extensible pad, for example, for engaging the surface of the formation 12 and means such as a bow spring 24 for urging the housing 20 and the logging device 22 toward the opposite borehole wall to hold the logging device 22 in the firm engagement with the surface of the formation.

Both the logging device 22 and the bow spring 24 preferably are mounted on the housing 20 so as to be movable between the extended wall engaging positions shown in FIG. 1 and retracted positions within or adjacent the housing 20. The logging device 22 may be maintained at the retracted position during movement of the tool 16 in the borehole and is caused to be extended from the housing into engagement with a formation to be investigated by actuation of a hydraulic system, for example, from the ground surface. Preferably, the device 22 is arcuate in horizontal cross section so as to conform generally to the borehole wall.

Figure 2:
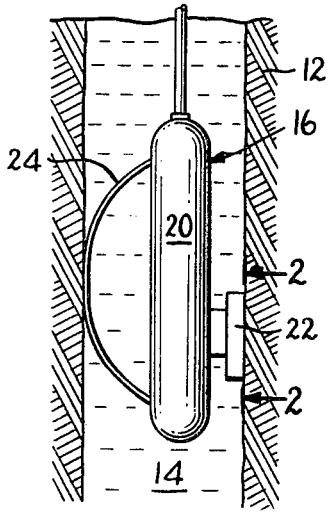
FIG. 2 is a detailed elevational view of the logging device of the apparatus, taken along the line 2-2 of FIG. 1 and looking in the direction of the arrows.

A polarizing DC current is set up on the formation 12 between a DC field electrode 26 mounted on the formation-engaging face of the logging device 22 (see FIG. 2) and a return electrode (not shown) for the DC field located for convenience on the upper portion of the housing 20. The return electrode is referenced to ground at the surface of the earth through a conductor (not shown) in the cable 18. Typically, the fluid contained in the pores of subsurface formations is of sufficient salinity, either naturally or because of the saline content of the drilling mud, for measurable levels of polarization to be created in the formation upon passage of the polarizing current.

To insure that the polarizing current is directed from the electrode 26 into the formation 12, a bucking current is set up between a second DC electrode 28 positioned on the device 22 in spaced relation to the main electrode 26 and the same return used for the polarization current. The potentials of the electrodes 26 and 28, therefore, are of the same polarity and are maintained at such relative strengths that there will be no current flow between them along the face of the device 22. For this purpose, a DC generator 30 is connected to the electrodes 26 and 28 through conductors, indicated at 32 in FIG. 1, in the cable 18.

After activation of the electrodes 26 and 28 to set up the polarizing and bucking currents, respectively, the polarization level of the formation is determined by measuring the resistivity of the formation electrolyte by passing an AC current between one or more AC electrodes 34 and 36 and a return electrode (not shown) mounted on the housing 20. Power is supplied to the AC electrodes by an AC generator 38 through a conductor 40 in the cable 18, and the AC return electrode is connected by a conductor 42 to ground through suitable indicating and recording apparatus located at the ground surface.

The resistivity electrodes 34 and 36, in addition, may be used to determine whether any adjustment of the bucking current is required in order to maintain a condition of zero DC current flow between the electrodes 26 and 28. This can be done, for example, by attaching a voltmeter across the leads to the resistivity electrodes 34 and 36 prior to making polarization measurements and while the logging device 22 is in position against the formation surface. In this way, variations in the measured quantities due to local currents or leakage currents between the electrodes 26 and 28 can be minimized.

An AC current is preferred for making the resistivity measurements in order that the difficulties arising from contact potentials can be avoided. This is of significance from a practical viewpoint since contact potentials often interfere with the measurement of electrokinetic potentials. Ideally, an AC current of a frequency on the order of 1,000 cycles per second is used so that the AC return signals can be easily isolated from the DC current return signals.

The resistivity of the electrolyte is measured either by applying a fixed current value between the electrodes 34 or 36 and the return electrode and measuring the voltage drop across the formation, or by applying a fixed voltage across the formation and measuring the magnitude of the current set up between the electrodes. In either event, the resistivity is derived through a solution of Ohm's law. Conversion of the measured quantities into resistivity terms is preferably carried out automatically in the indicating and recording apparatus, which illustratively includes a voltmeter, or ammeter, and appropriate recording equipment, indicated schematically in FIG. 1 at 44 and 46, respectively, for presenting the data obtained in a desired form.

After the polarization level of the formation is obtained, movement of the fluid contained in the formation relative to the formation matrix is generated. Since the direction of fluid flow is known to have no significant effect on the reduction in the polarization level, the fluid motion is conveniently induced by use of a sonic transducer 48 mounted on the logging device 22 in spaced relation to the main DC field electrode 26. Excitation frequencies in the range of from about 100 to 500 cycles per second are preferred inasmuch as they produce, in effect, a "squeezing" of the formation and thereby cause flow of the fluid through the pores of the formation. If desired, high excitation frequencies on the order of from about 20,000 to 100,000 cycles per second can be used, or frequencies of less than 100 cycles per second, if necessary, with relative movement between the formation and the fluid occuring as a result of motion of the formation and the inertia of the fluid in the case of high frequencies, and fluid motion in response to the lower excitation frequencies. In either event, movement of the formation fluid relative to the formation is produced, and, consequently, the polarization level of the formation is reduced. Thereafter, and during the application of the sonic energy, an AC current is again passed between the electrodes 30, 32 and the return electrode and measurements of the resistivity of the formation during fluid flow are made and recorded.

The extent of the reduction in the polarization level is then determined, either manually or through the use of suitable calculating apparatus (not shown), which conveniently can be operatively connected to the recording apparatus 46. The data thus generated are then compared with similar data from formations of known permeability to make qualitative determinations of the permeability of the formation investigated. To this end, the measured quantities can be indicated and recorded in terms of an index of permeability representing the following relationship:

$$(\alpha - \alpha_f)/(\alpha)$$

where, $\alpha$ is the polarization level of the formation without fluid flow, and $\alpha_f$ is the polarization level of the formation with fluid flow.

The use of the index facilitates analysis of the formation measured because it is readily apparent that a high index, for example, an index of 0.4 is indicative of high permeability and a low index, for example, an index of 0.1, is indicative of low permeability. Moreover, it is possible experimentally to correlate the index with the actual permeabilities of previously studied formations so that the actual permeability of a measured formation can be approximated with reasonable accuracy merely by applying a constant to the index derived from the measured quantities. Such a procedure can be, and preferably is, carried out automatically in suitable calculating apparatus if the applicable constant has previously been determined. If not, relative permeability data can nonetheless be obtained through the expedient of comparing the index of the measured formation with the index of a formation of known permeability.

The present invention is also readily adapted to the making of continuous permeability measurements since it is not necessary to determine polarization decay times, but only levels of polarization. For example, such a use of the invention would allow a continuous permeability log to be maintained of the formations traversed by a borehole.

Preferably, measurements are made at each location within the borehole at which permeability studies are to be made at a plurality of excitation frequencies in order that reliable indications of the polarization levels are obtained. Also, measurements made during fluid flow should be continued over an excitation period of sufficient duration that a full reduction in the electrical resistivity of the formation electrolyte is produced.

Another important feature of the present invention is that the presence of a mudcake on the borehole walls does not materially affect the making of polarization level measurements other than to reduce the magnitude of the polarizing current and the resistivity measuring currents entering the formation. Polarization of the formation is nevertheless created, and a reduction in the level of polarization is observable, since the applied sonic energy is effective to cause fluid flow in the formation notwithstanding the presence of the mudcake. The polarization level data obtained can, therefore, be compared with corresponding data from formations of known permeability that are also traversed by mudded-off boreholes to obtain knowledge of the relative permeability of the formation investigated.

It will be understood by those skilled in the art that the above-described embodiment of the invention is intended to be merely exemplary, and that it is susceptible of modification and variation without departing from the spirit and scope of the invention. For example, other means may be employed for applying sonic energy to a formation surface, such as, for example, an electroacoustical transducer apparatus of the type disclosed in the prior art U.S. Pat. No. 3,138,219. All such variations and modifications, therefore, are included within the scope of the invention as set forth in the appended claims.

I claim:

1. A method for investigating the permeability of earth formations traversed by a borehole and containing a fluid in the pores thereof, comprising the steps of
    passing a polarizing DC electric current through a formation to be investigated at a location in a borehole,
    determining the polarization level of the formation during passage of the polarizing current,
    thereafter exciting the formation during passage of the polarizing current to induce fluid flow in the pores thereof,
    determining the polarization level of the formation during fluid flow, and
    determining the relative polarization level from that existing without induced fluid flow to that existing with induced fluid flow to obtain an indication of the permeability of the formation.

2. A method according to claim 1 in which the polarization levels are determined by measuring the resistivity of the formation electrolyte.

3. A method according to claim 2 in which the resistivity is measured by applying a 1,000 cycle per second AC source across the formation.

4. A method according to claim 1 in which the formation is excited by sonic energy.

5. A method according to claim 4 in which the formation is sonically excited at a frequency within the range of about 100 to 500 cycles per second.

6. A method according to claim 4 in which the polarization levels are determined by measuring the resistivity of the formation electrolyte.

7. A method according to claim 6 in which the resistivity is measured by applying a 1,000 cycle per second AC source across the formation.

8. A method for investigating the permeability of earth formations traversed by a borehole and containing a fluid in the pores thereof, comprising the steps of
    positioning a sonic transducer opposite a formation to be investigated at a location in the borehole,
    passing a polarizing DC current through the formation,
    determining the polarization level of the formation during passage of the polarizing current,
    thereafter actuating the sonic transducer during passage of the polarizing current to excite the formation and thereby induce fluid flow in the pores of the formation,
    determining the polarization level of the formation during fluid flow, and
    determining the relative polarization level from that existing without induced fluid flow to that existing with induced fluid flow to obtain an indication of the permeability of the formation.

9. Apparatus for investigating the permeability of earth formations traversed by a borehole and containing a fluid in the pores thereof, comprising
    means for passing a polarizing DC current through a formation to be investigated at a location in the borehole,
    means for sonically exciting the formation to cause fluid flow through the pores of the formation,
    means for determining the polarization levels of the formation during passage of the polarizing current without fluid flow and with fluid flow, and
    means for determining the relative polarization level from that existing without fluid flow to that existing with fluid flow to obtain an indication of the permeability of the formation.